UNITED STATES PATENT OFFICE.

HANS WREDE, OF BERLIN, GERMANY, ASSIGNOR TO CORN PRODUCTS REFINING CO., OF NEW YORK, N. Y., A CORPORATION OF NEW JERSEY.

COATED PAPER AND PROCESS OF MAKING THE SAME.

1,147,996.    Specification of Letters Patent.    Patented July 27, 1915.

No Drawing.    Application filed November 8, 1912. Serial No. 730,202.

*To all whom it may concern:*

Be it known that I, HANS WREDE, a citizen of the Empire of Germany, and a resident of Berlin, Germany, have invented certain new and useful Improvements in Coated Paper and Processes of Making the Same, of which the following is a specification.

The present invention relates to the preparation of paper adapted for fine lithographic printing or like artistic work,—generally speaking the kind of paper that is employed for the purpose of bearing the illustrations in books and magazines. Heretofore one of the most successful preparations for coating paper in this fashion has consisted chiefly of casein applied to the fibrous paper in numerous ways. A mixture of starch paste and gelatin has also been suggested but has not, so far as I am aware, ever been used. While these preparations are to a certain extent commercially successful, the paper coated therewith does not come up to the ideal printing requirements and it is the object of the present invention to produce a paper which shall have the valuable properties of the coated papers heretofore known and in addition thereto will be considerably cheaper and better. Underlying the present invention is the idea of employing for the coating of the paper an inorganic substance, or more particularly an argillaceous substance, such as kaolin, china clay, blanc fixe or satin white. These substances, however, having no adhering qualities cannot be used directly upon a paper nor if used directly would they provide the paper with a coating suitable for fine printing. It is therefore necessary to apply the substances to the paper in some manner by which they will permanently adhere to the fibrous portions of the paper and will also be converted into a printing surface suitable for the reception of lithographers' or printing ink or printing colors. In order to bring about this result I have discovered that if the fine particles of kaolin or similar material be surrounded with some colloidal substance to which has been given the property of adhering firmly to the fibrous paper on the one side, and to armor or protect the exposed face with a sort of glaze or horny condition, I will be enabled to accomplish the desired result. In order to bring about these conditions, I may employ for instance the following substance in the following manner: Boil about 17½ lbs. of starch with four gallons of water. The starch in question should preferably be of the kind known as thin boiling, or modified starch, or in fact any starch which will have the property of adapting it for use in connection with textile materials. For the purposes of this specification, the expression thin boiling starch amply described the nature of the material. The starch is boiled until the starch is clear and freely flowing, an operation which with suitable appliances may be carried out in about ten minutes. Two quarts of a ten per cent. alum solution are then added separately. I mix about 40 lbs. of china clay (or the like) in finely divided condition with about two quarts of water glass (silicate of soda) and about three gallons of water until the clay is in the condition of a suspension. The water glass is the ordinary commercial substance of a consistency which may be defined as syrupy. These two separately prepared liquids, starch, alum and water on the one hand, and clay, silicate and water on the other are then mixed. It is to be understood that previous thereto the starch and the alum have become very intimately intermingled while the particles of clay are each intimately associated with a portion of the silicate. When the two bodies of liquid are mixed, the alum which may be termed a precipitant for the purposes of this specification, coming into contact with the silicate forms a colloid. Alum and silicate of soda cannot exist as such together but modify each other in such a manner that a precipitate is formed. This colloidal precipitate being thus formed as it were around a nucleus of a particle of clay is floating in a volume of dissolved starch constituent and retains as it is precipitated out of the liquid a material proportion of such starch. The precipitate is brushed or otherwise placed upon the fibrous paper in a manner well understood in the art of coating paper.

The finished paper has a smooth and glossy surface. It is less brittle than casein coated paper and the pigment thus applied seems to adhere better to the fibrous part of the paper so that when the printing plate is pressed down upon this paper, no fragments of the coat are carried away with the type. This paper also exhibits a more uniform distribution of color when applied in relatively large surfaces. It tends to give the printing colors more variety of tone and thereby avoids the monotonous effects of ordinary lithographic printing. The paper has a marked ink absorbing quality, so that although it may require slightly more ink than casein coated paper the ink dries very much more rapidly so that it is no longer necessary in stacking up the printed sheets as they come from the press to use intermediate slip sheets. The process of manufacture is less expensive than that in which either glue or casein is employed. The manufacturing process is also simpler, the starch requiring only to be boiled while the casein must be treated with alkali, nor has this paper the disagreeable odor of casein coated papers. It does not deteriorate with time. The coated paper of this application can be readily identified by applying two tests.

The paper does not respond to test known as Adamkiewicz's test but with 1/100 normal iodin potassium iodin solution it will become colored dark blue or purple. In other words it will show the characteristic starch reaction. When ordinary starch is used the color of this reaction will be rather dark blue. With other kinds of starch, the color has a more reddish or purplish tinge. This test applied to casein paper colors it yellow and casein paper also shows a marked reaction with Adamkiewicz's reagent or other reagent to show albumen.

Instead of "thin boiling" starch there may be advantageously used a modified starch of the character described in Letters Patent No. 855,599, patented June 4, 1907, by T. B. Wagner. The use of such a starch is of particular advantage because it does not have to be boiled, but can be dissolved with cold water. This quality adapts it for use in connection with satin white. Satin white when heated seems to puff up but when treated with a cold process such as is made possible with this special form of modified starch results in an unusually good coating. The iodin test with paper thus produced produces a purplish color. With respect to the iodin test it may be said that this test is effective even on colored papers, the colors of the paper only slightly affecting the characteristic dark blue or purplish effect.

It should also be stated as an important part of the process that the silicate of soda should be present in quantities exceeding those of the alum used. Silicate of soda is neutralized by about 20% of alum. If the silicate is completely neutralized or if the precipitating agent (alum) is present in excess the process will not result satisfactorily. Care should be taken that there will always be soluble silicate of soda in the suspension even though the silicate may be partly neutralized by the alum.

It is obvious that many modifications may be made in the process without departing from its essentials. The precipitating agent need not be alum but may also be borax or calcium, barium, strontium, or magnesium chlorid or even acids, but alum is preferred. Different kinds of starch may also be used, as for instance potato, corn, rice or other starches in their natural state or modified form. The process may also be varied to adapt it for special purposes, as for instance, by the use of formaldehyde and ammonia in proportions of say 3 ounces to 9 ounces diluted, which will add a water proofing quality to the paper. Coloring matter may also be added.

I claim:

1. In the art of making coated paper that improvement which consists in applying to the paper an argillaceous pigment with a silicate precipitated out of a starch solution.

2. In the art of making coated paper that improvement which consists in preparing a thin flowing starch fluid and causing a finely divided argillaceous substance associated with a water soluble silicate to be precipitated from the starch fluid and applied to the paper.

3. In the art of making coated paper that improvement which consists in employing a finely divided argillaceous substance and applying the same to the paper by means of a silicate precipitated from a starch fluid.

4. In the art of making coated paper that improvement which consists in suitably applying to the paper a precipitate formed by treating a finely divided argillaceous substance suspended in a water soluble silicate, with a starch solution containing a suitable precipitating agent.

5. A coated paper having a fine smooth surface suitable for fine printing work the said coating resulting from the precipitation out of a starch solution of an argillaceous substance associated with a silicate, the said coating being neutral with respect to Adamkiewicz's reagent but exhibiting the presence of starch when subjected to the iodin test.

In testimony whereof I have hereunto set my hand in the presence of two subscribing witnesses.

HANS WREDE.

Witnesses:
HANS V. BRIESEN,
FRITZ ZEIGLER, Jr.